(No Model.) 2 Sheets—Sheet 1.
J. B. HURD.
HOEING MACHINE.
No. 416,840. Patented Dec. 10, 1889.
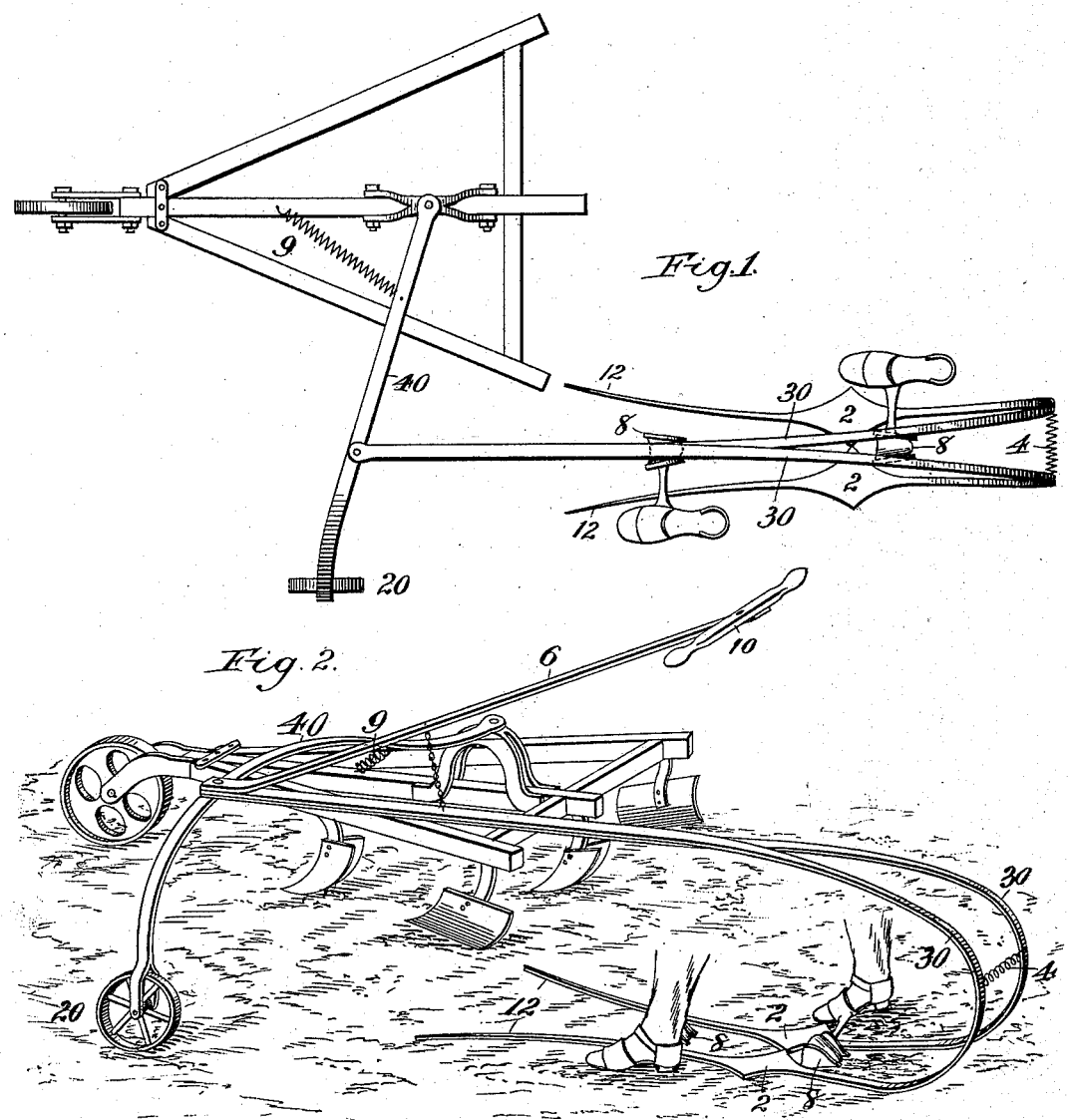
Witnesses:
M. Wagner
S. C. Moore
Inventor.
Judson B. Hurd (No Model.) 2 Sheets—Sheet 2.
J. B. HURD.
HOEING MACHINE.
No. 416,840. Patented Dec. 10, 1889.
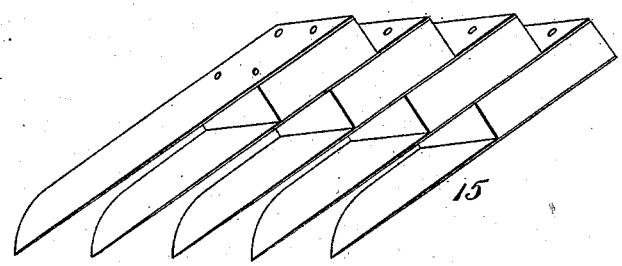
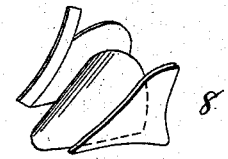
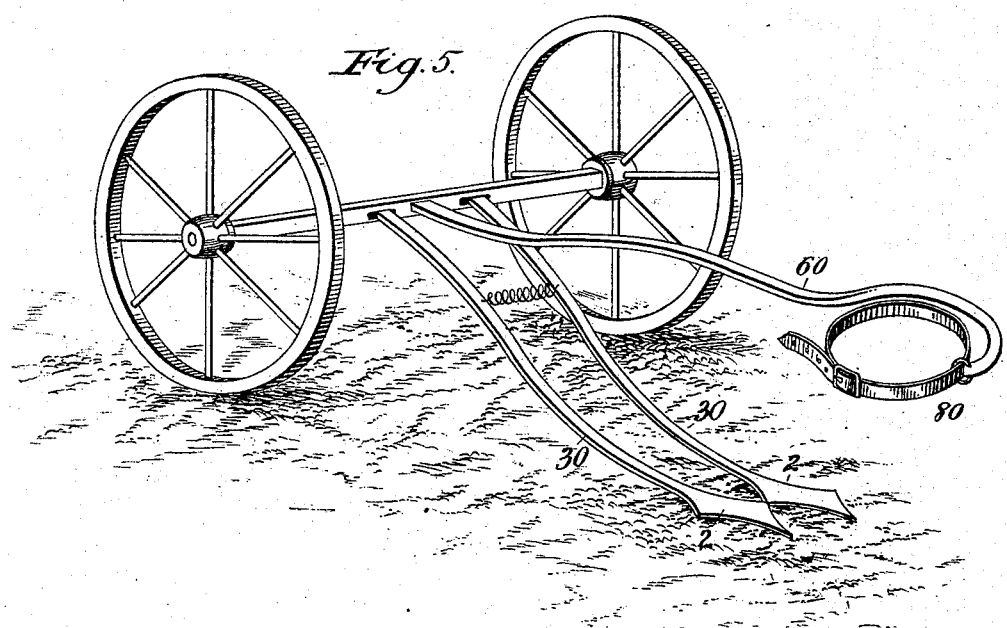
Witnesses:
M. Wagner
S. C. Morse
Inventor.
Judson B. Hurd.

UNITED STATES PATENT OFFICE.

JUDSON B. HURD, OF SAN ANTONIO, TEXAS.

HOEING-MACHINE.

SPECIFICATION forming part of Letters Patent No. 416,840, dated December 10, 1889.

Application filed November 23, 1887. Serial No. 256,019. (No model.)

*To all whom it may concern:*

Be it known that I, JUDSON B. HURD, a citizen of the United States, residing at San Antonio, in the county of Bexar and State of Texas, have invented a new and useful Hoeing-Machine, of which the following is a specification.

My invention relates to improvements in hoeing-machines and other cultivators, whether for horse or hand power, that are intended to cultivate close to and entirely around small plants, and the main objects of my improvements are, first, to afford facilities for the more ready and perfect protection of the plant while the pulverizing-blades are cultivating the soil around it; second, to provide a better and more ready means of guiding the pulverizing-blades along the row and around the plants. I attain these objects by giving my guiding-fender a motion independent of the motion of the pulverizing-blades. This new principle I illustrate in the accompanying drawings, and show some of the ways in which I contemplate applying that principle.

Figure 1 is a top view of a cultivator-frame having my improved hoeing-machine attached. Fig. 2 is a perspective view of the same, showing the fender attached to a boot. Fig. 3 is an enlarged perspective view of the fender. Fig. 4 is a front perspective view of a set of pulverizing-blades with sharpened front edges. Fig. 5 shows a modification of my device.

An ordinary cultivator is provided with a laterally-extending arm 40, one end pivoted to the cultivator-frame and the other end reaches out over the row of plants to be hoed. Loosely connected to this extended end of the arm are a pair of hoeing-cranes 30 30, which extend back and carry blade-supporting frames 2 2. The arms of the double crane being connected by a spiral spring 4, the frames 2 2 are caused to normally press against each other.

Each boot of the operator is provided with a fender or guiding device 8, which has an arched shank and stands out a few inches from the inside of the boot and is securely fastened to it by means of frame and straps. A handle-bar 6 is also connected with the arm 40, and, extending back, is loosely chained to the arms of the double crane, and is provided with a pivoted cross-piece 10, having hand-places at the ends. A spring is also arranged in such relation to the arm 40 and the cultivator-frame as to normally keep the extended end of the arm pointing somewhat forward to allow the operator by pulling back on the handle to check the speed of the horse and regulate the motion of the hoeing attachment with ease.

The operation of the machine (shown in Fig. 1) is as follows: The operator straddles the row, and in walking places his foot so that the fender 8, which is strapped to his boot, will be close up to and partly over the plant to keep it from being covered or bruised and to cause the blades to move around the plant at the distance desired. When the weight of the operator's body is thrown on this foot and the fender thereby held firmly in place, one hoeing-frame 2 passes between the fender and foot and the other frame passes on the other side of the fender and plant, after passing which the spring 4 brings the blades together again. In the meantime the other foot is reached forward and placed so as to bring the flexible guiding-rod 12 between the fender 8 and the boot, and the fender is pressed on the ground near the next plant, there to remain at rest until the hoeing-frames pass it in turn. It will be seen that the fender operates also as a guide. By its position between the guiding-rods it keeps the frames in line from one hill to another.

The fender for small plants may be formed like an inverted scoop, with its front edge down to the ground, as shown; but fenders may be made in different forms or of different sizes to suit the size and character of different plants to be cultivated or when it is desired to save two or more plants in a hill. The hoeing-frames support a series of pulverizing-blades, which stand at an angle of about forty-five degrees, and should be set with their tops leaning forward and with their lower ends pointing outward, thus being adapted to cut the crust before lifting or disturbing it, and to turn the soil over as well as to cut it fine. They are secured to the under side of the frame 2, which is provided with grooves to receive them. When larger plants are to be cultivated, and when fenders with long handles to be managed by hand are used, as shown in Fig. 5, revolving disks or large blades of any pattern may be substituted for the blades described and be attached to the frames by any of the well-known methods.

I am aware that machines have been made with fenders to protect the plants from being covered with dirt, and machines with pulverizing-blades that are intended to cultivate the plant on different sides; but in such machines, the fender and the blades being made to move forward simultaneously, the eye is required to watch them and the muscles to manipulate them while they pass the plant, and if close and exact work is to be done the eye and the muscles cannot be used quick enough for the purpose without requiring the machine to pass very slowly. A motion must be made at the very instant of passing a certain point; sooner or later will not do.

In my invention I introduce a new principle in hoeing-machines and other cultivators—i. e., an independent motion in the protecting and guiding device whereby to gain a margin of time for its management. The operator is enabled by moving the fender forward quickly to gain time for placing it more deliberately and exactly in position without checking the motion of the pulverizing-blades or requiring the machine to pass so slowly by the plant as it otherwise must. One foot or hand can easily be moved forward at more than double the speed that the body moves in walking at an ordinary pace, leaving more than half the time for each hand or foot to place the fender in position and hold it in place until the blades pass, and by this means perfect hoeing may be done without checking the speed of an ordinary walk.

A machine to be propelled by hand may be constructed as shown in Fig. 5. A side shaft reaches back and is strapped to the waist and the implement pushed in front, and in this or either case the fender may be provided with a long handle to be managed by hand, instead of being fastened to the boot.

Several pairs of hoeing-frames may be attached to a long cross-bar mounted on wheels and several rows be hoed at the same time, having a horse to pull or to push it and one operator to each row; and it will readily be seen that a set of fenders may be made to answer the same purpose as above described and yet not be so entirely independent in their connection and support of the blade-support, but still have that independent movement whereby a margin of time is gained, as I have described; so I desire not to limit or confine myself to any precise form, arrangement, or manner of constructing any of the parts described or to one particular manner of applying the principle of my invention, but to explain somes modes in which I have contemplated applying that principle.

Having thus described my invention, I claim as new and desire to secure by Letters Patent—

1. The combination, in a hoeing-machine, of frames or supports adapted to carry cultivating-blades on both sides of the plants and a fender that controls the movement of the blades in respect to their distance from the plant by taking a position in reference to the plants independently and in advance of the means of cultivation and remaining in that position while the blades cultivate around the plant, substantially as shown and described, and for the purposes specified.

2. The combination, in a hoeing-machine, of hoes or blades and a fender or plant-protector, each controlled and operating independently of the other, that the protecting device may remain at rest while the blades cultivate around the plant, substantially as shown.

3. The combination, in a hoeing-machine, of hoeing-cranes 30 30, each carrying a blade-supporting frame 2 2, with handle 6 and 10, arm 40, and wheel 20, all substantially as set forth.

4. In a hoeing-machine, the combination of blade-supporting hoeing-frames 2 2 with fenders 8 8, said fenders being adapted to be controlled independently of the movement of the frames, substantially as described, and for the purposes specified.

5. In a hoeing-machine, the guiding-fender 8, adapted to protect the plant and to guide the blades, as and for the purposes specified.

6. In a hoeing-machine, the combination, with cultivating-blades of or knives connected to a machine or frame and arranged to pass on both sides of a row of plants and to cut between the hills in a row, of a fender or plant-protector adapted also to cause said knives to pass around a hill and to control the distance of the blades from the hills or plants, the fender having a movement independent of the blades, whereby the fender may take position near the plant in advance of the cultivating-blades and remain at rest till said blades have passed, for the purpose specified.

JUDSON B. HURD.

Witnesses:
J. P. SMITH,
W. H. YOUNG.